United States Patent Office 3,522,082
Patented July 28, 1970

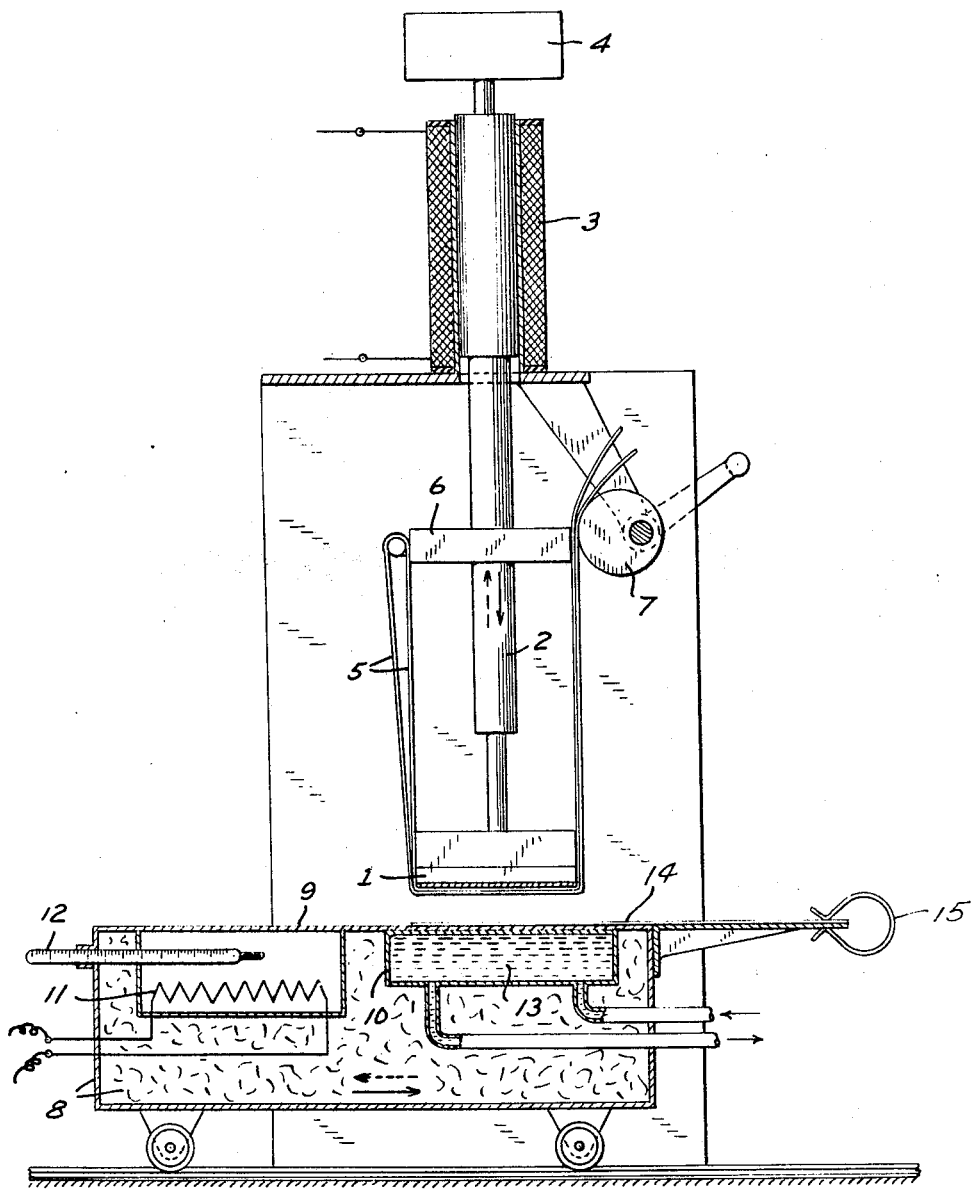

3,522,082
ADHESIVE COATED FILMS
Guy Grandsaignes d'Hauterive, Mantes-la-Jolie, and Pierre Hullot, Limay, France, assignors to Cellophane Investment Company Limited, Alderney, Channel Islands
Filed Nov. 20, 1964, Ser. No. 412,730
Claims priority, application France, Nov. 29, 1963, 955,491
Int. Cl. C08f 29/22; C09j 7/02
U.S. Cl. 117—122          12 Claims

ABSTRACT OF THE DISCLOSURE

A heat-sealable wrapping material comprising a film having a coating consisting of a vinylidene chloride copolymer which contains from about 85 to 95% vinylidene chloride and 2 to 10% of a resin having a melting point above 150° C. selected from the group consisting of a derivative of colophony, a coumarone resin, a polymerized silicone resin and a terpenephenol.

---

This invention relates to films coated with vinylidene chloride copolymer coating compositions. It is known to provide films especially hydrophilic films such as regenerated cellulose with impermeable coatings which impede the passage of water vapour or at least increase the resistance to the passage of water vapour. Likewise it is known to improve the adhesion of the coatings to the base films, particularly in the presence of water.

Suitable coating compositions which have been developed for imparting together the desired degree of moisture-proofness, resistance to water and heat-sealability are based upon vinylidene chloride copolymers obtained by copolymerizing a major proportion of vinylidene chloride with a minor proportion of one or more other vinyl monomers, in particular acrylonitrile. The vinylidene chloride content in such copolymer coating composition is usually in the range between 85% and 95% by weight.

It has been observed, however, that on rapidly working automatic packaging machines, such as those which are actually used at present, when such coated films are used, hardening of the coatings which have been softened in the course of heat-sealing operations is insufficiently rapid, so that sealed packages have a tendency to adhere to one another when they come into contact and, in particular, when they are pressed together. The phenomenon of this adhesion in the cold is produced especially on automatic machines in which the packages are subjected to light and repeated shocks or impacts in the delivering shute of the machine where, after sealing, the packets are pushed towards collectors. The adhesion in the cold is also observed in stacked boxes by reason of continuous pressures.

It has now been found that these adhesion effects can be reduced by introducing into the coating compositions resinous products having a melting point above the temperature of sealing of the coating composition.

It is important that the resinous products should have no appreciable harmful effect upon the usual water vapour impermeability and sealability obtained by the use of these coating compositions. It has been found that certain resinous compounds added in limited quantities have the effect of reducing the adhesion in cold to a sufficient extent without excessive influence upon the other properties of the heat-sealable coatings.

Suitable resinous products are natural or synthetic resins whose melting points lie between 120° and 200° C. and which are compatible with the products which enter into the coating compositions containing essentially or mainly copolymers of vinylidene chloride, for example vinylidene chloride/acrylonitrile copolymer.

Accordingly, the present invention includes a heat-sealable wrapping material comprising a film coated with a heat-sealable coating including a vinylidene chloride copolymer containing a major proportion of vinylidene chloride and at least one compatible natural or synthetic resin having a melting point lying within the range 120° to 200° C. and being present in an amount which does not substantially reduce the moisture proofness and heat-sealability of the coating.

As the amount of resin in the coating increases, the phenomenon of after-sealing adhesion progressively disappears but as the amount of resin exceeds 3% by weight an impairment in the properties of the seals becomes detectable. More particularly the amount of resin in the coating should not exceed about 10% by weight.

The optimum amount of resin incorporated in the coating to reduce the after-sealing adhesion effects with the minimum impairment of the water-vapour impermeability and sealability is about 3% by weight, that is, in the range between about 2 and 5%.

It has been observed that the best results are obtained with resins whose melting point exceeds 150° C. and that these effects can be accentuated by the complementary addition of small quantities of silicones.

Suitable resins which are useful in the practice of the invention are derivatives of colophony, and in particular, very good results are obtained with pentaerythritol esters of polymerized colophony, such as is marketed by Hercules Powder Company of Wilmington, Del., United States of America, under the name "Pentalyne K." "Pentalyne K" has a melting point of between 189° and 197° C. Resins based on modified colophony are equally suitable, good results being obtained from the use of the product sold by Badische Anilin- & Soda Fabrik A.Q., of Ludwigshafen (Rhine), Germany, under the name of "Laropal B" whose melting point is between 150° C. and 160° C.

Other suitable resins include coumarone resins whose melting point exceeds 125° C., which likewise give good results within the scope of the invention but their effect is more limited because of their relatively low melting point, terpene-phenol resins whose melting point exceeds 150° C. and silicone resins such as are supplied by Rhone-Poulenc of Paris, France, under the name "Rhodorsil."

The invention also includes a heat-sealable coating composition for coating a film with a heat-sealable coating comprising a vinylidene chloride copolymer containing a major proportion of vinylidene chloride, at least one compatible natural or synthetic resin having a melting point lying within the range 120° to 200° C. and being present in an amount which does not substantially reduce the moistureproofness and heat-sealability of the coating and a volatile organic solvent, such as a mixture of methyl ethyl ketone and toluene.

The coating composition may also contain other conventional additives such as slip agents, for example glycerine trihydroxystearate, antiblocking agents for example silica, and acid catalysts for the promoting of condensation of anchoring agents previously applied to the film, for example maleic acid.

The invention will now be further described by way of specific examples of the manufacture of heat-sealable wrapping materials and measurements carried out by means of an experimental apparatus constructed to reproduce the conditions of after sealing adhesion which occur on automatic rapid wrapping machines and for the measuring of the effect.

In the description, the term "adhesive power" when referring to either seals formed by heat-sealing two coated films or to after sealing adhesion already described above, is the linear force required to separate the sealed or adhering parts expressed in grams measured on test pieces 38 mms. wide, and the term "sealing threshold" is the minimum temperature necessary to obtain a heat-seal between two coated films corresponding to an adhesive power of 50 gms.

The incorporation of the resin in the coating in accordance with the invention has the effect of raising the sealing threshold of the coated films in relation to coated films in which the coatings do not contain the resins.

The apparatus for evaluating the adhesive power in after-sealing adhesion under conditions corresponding with the conditions obtained in practice on automatic packaging machines is represented diagrammatically in the accompanying drawing.

The apparatus is composed essentially of a pad 1 whose lower face, coated with rubber, consists of a rectangular surface which, for example, is conveniently 5 cms. by 2.8 cms. (that is, 14 square cms.).

The pad 1 is fixed to a vertical rod 2 which may be drawn up in a known manner by an energized electromagnet 3 and which can fall under its own weight. The upper part of the rod 2 is weighted by a variable weight 4.

A test piece 5 consisting of a strip 38 mms. in width of the coated film to be tested is fixed between the edges of a plate 6 fixed to the rod 2 in such a way that a double thickness covers the lower face of the pad 1. The ends of the test piece 5 are trapped against the edge of the plate 6 by means of an eccentric clamp 7.

Below the pad 1 is placed a carriage 8 which can be moved to and fro laterally in known manner by an energized electromagnet and a return spring (not shown) to present a sealing plate 9 or a small metal box 10, as required, to the pad 1.

The sealing plate 9 is heated to a desired temperature by means of a resistance 11 measured by a thermometer 12 and maintained by a thermostat (not shown).

The box 10 consists of a metal box heated on the inside by water jacket 13 through which water at a predetermined temperature is circulated. A film 14 coated of the same material as the test piece 5 is fixed by a clip 15 on the upper part of the box 10.

An electronic timing device (not shown) ensures synchronization of operation provided by a small motor having a cam on its shaft (not shown).

The apparatus is operated as follows:

When the test-piece 5 is in place and the carriage 8 is in such a position that the sealing plate 9 is below the pad 1, the latter is permitted to fall, thus causing the two thicknesses of the test piece 5 to seal to themselves under the conditions already described. The pad 1 is then withdrawn to the upper position by the energization of the electromagnet 3 and the carriage 8 is displaced so that the metal box 13 covered by the film 14, in its turn, comes below the pad 1 which is covered with the sealed test piece 5.

The pad 1 is allowed to fall again and the test-piece 5 and film 14 make contact under determined conditions of time and temperature.

The film 14 and test-piece 5 are removed and the adhesive power of the after-seal adhesion between the film 14 and test-piece 5 is measured by means of a known type fo dynamometer.

The apparatus permits, for example, the following range of experimental conditions—

Heat-sealing:
    Temperature 30° to 250° C.
    Duration ⅛ to 2 seconds
    Pressure 250, 500, 1000, 2000 grams
Duration of cooling:
    ¼ to 1 second
Adhesion:
    Temperature up to 80° C. max.
    Duration—¼ to 7 seconds.
    Pressing force—sufficient to bring about sealing.

This apparatus permits measurements to be obtained having a range of the order of 15%. The mean of 5–10 measurements provides a result sufficient for practical purposes.

Experiments made by means of this apparatus have made it possible to collect the following results:

(1) The after seal adhesion decreases on the one hand with the reduction of the sealing temperature particularly if this temperaure is reduced from 60° to 30° C. and, on the other hand, by reducing the pressure exerted.

(2) The raising of the sealing threshold which is obtained by incorporating the resins in the coating is always accompanied by a reduction of adhesion following sealing.

(3) The addition of increasing quantities up to 5% of the resin causes a progressive disappearance of adhesion after sealing, but beyond 3% a detectable impairment of the seals.

(4) The addition of 3% of "Pentalyne K" to coating composition based on the vinylidene chloride copolymers entirely suppresses the adhesion after sealing without harmful effects on the impermeability and the quality of the seals at sealing temperatures of up to 60° C.

Specific examples using the apparatus will now be described.

EXAMPLE 1

A film of regenerated cellulose weighing about 30 gms. per sq. m. containing about 7% by weight of water and 15% of glycerine and incorporating about 0.5% resin (urea-formaldehyde) to improve anchorage, is coated with a coating composition based upon a copolymer of 91% vinylidene chloride and 9% of acrylonitrile such as is marketed by Solvay et Cie of Brussels, Belgium, under the name of "Ixan WN91," as follows, in which the parts are in grams:

| | |
|---|---|
| 91/9 Vinylidene chloroide/acrylonitrile copolymer (Ixan WN91) | 100 |
| Glycerine trihydroxystearate | 3 |
| Silica | 0.1 |
| Maleic acid | 0.25 |
| Methylethyl ketone | 315 |
| Toluene | 245 |

The two surfaces of the cellulose film are coated with 22–28 grams of coating composition which contains about 18% solids in such a way that after evaporation of the solvent, a dry coating of about 4–5 grams per sq. m. of film is present on each of the two faces.

The film thus coated is then tested by means of the apparatus previously described. At first a seal is made of two superimposed test portions made from folded film for ¼ second at 200° C. under a pressure of 1 kilogram distributed over the 14 sq. cm. surface of the pad. A ¼ second later this combination is applied to another sample of the same film kept at 60° C. with the same sealing conditions, that is to say, of 1 kilogram acting for ¼ second and distributed over the 14 sq. cm. of surface. The forces necessary to separate the films over a width of 38 mms. are measured and expressed in grams.

The adhesive power as defined above, obtained by sealing the film to itself, is found to be 350 and that of the part of the sealed test-piece sealed to the film at 60° C. is 150.

If, in the described coating composition, 10 grams of coumarone resin (melting point 150° C.) are incorporated, the adhesive power results are 300 (test portions sealed together) and 50 (sealed test-portions to film at 60°). It is seen that the adhesive power of the sealed part on the cool film is considerably reduced.

EXAMPLE 2

The cellulose film is as in Example 1 except that the urea-formaldehyde resin is replaced by an equal weight of melamine/formaldehyde resin and the lacquer has the following composition in grams:

91/9 Vinylidene chloride/acrylonitrile copolymer
(Ixan WN91) _____ 100
Laurone _____ 3
Calcium carbonate _____ 0.5
Citric acid _____ 0.25
Tetrahydrofuran _____ 440
Toluene _____ 185

The coating of the cellulose film with the lacquer of 15% solids is carried out as in Example 1 to yield 4 to 5 grams of dry coating per sq. m. Measurements are carried out with the apparatus as in Example 1.

The measurements show that the power of adhesion of the film to itself is between 300 and 400 and that of the sealed portion of the test pieces to the film at 60° C. is between 100 and 150.

If 3 grams of a pentaerythritol ester of polymerized colophony marketed as "Pentalyne K" by Hercules Powder Company are incorporated in the lacquer, these values are respectively 300–350 on the one hand, and between 0 and 25 on the other.

EXAMPLE 3

The film of regenerated cellulose employed is the same as that used in Example 2. The lacquer employed has the following composition in grams:

91/9 Vinylidene chloride/acrylonitrile copolymer
Ixan WN91) _____ 100
Stearone _____ 2
Argile (a clay) _____ 0.5
Methyl ethyl ketone _____ 315
Toluene _____ 245

The base film is coated with this lacquer having 18% solids to yield a dry coating of 4 to 5 grams per sq. m. and the coated film is tested on the experimental apparatus as in Example 1. The following results are obtained.

Adhesive power of the seal of the test-piece to itself is between 250 and 300, and adhesive power of the seal between the test-piece and the film at 60° C. to 100.

By adding 5 grams of a modified colophony sold by Badische Anilin- & Soda Fabrik A.G. under the mark "Laropal B," to the above lacquer, the adhesive power figures were reduced to 250 and 25, respectively.

EXAMPLE 4

The cellulose film employed is the same as that employed in Example 1, but the urea-formaldehyde resin is replaced by the polyalkylene imine marketed by Badische Anilin- and Soda Fabrik A.G. under the mark "Polymin P."

The lacquer employed has the following composition in grams:

91/9 Vinylidene chloride/acrylonitrile copolymer
(Ixan WN91) _____ 100
Laurone _____ 4
Bentonite _____ 0.75
Tetrahydrofuran _____ 440
Toluene _____ 185

The film is coated with this lacquer which contains about 16% solids so as to obtain a dry coating of 4 to 5 grams per sq. m. and the coated film is tested on the experimental apparatus as in Example 1.

The following results are obtained:
Adhesive power of the sealing of the test-piece to itself—250–300.
Adhesive power of the seal to the film at 60° C.–100.

If 2 grams of "Rhodorsil" 4670 (polymerizable silicone resin supplied by Rhone-Poulenc) are added to the above lacquer, the following results are obtained—250 to 300 and 25 to 50, respectively.

What is claimed is:
1. A heat-sealable wrapping material comprising a film coated with a heat-sealable coating consisting of a vinylidene chloride copolymer which contains from about 85 to about 95% by weight vinylidene chloride and at least one different resin having a melting point above 150° C., which different resin is selected from the group consisting of a derivative of colophony, a coumarone resin, a polymerized silicone resin and a terpene-phenol and which different resin is present in an amount of from about 2% to about 10% by weight.

2. A heat-sealable wrapping material as claimed in claim 1, in which the amount of resin present in the coating is in the range between 2 and 5% by weight.

3. A heat-sealable wrapping material as claimed in claim 1 in which the resin is a derivative of colophony.

4. A heat-sealable wrapping material as claimed in claim 1 in which the resin is a pentaerythritol ester of polymerized colophony.

5. A heat-sealable wrapping material as claimed in claim 1 in which the vinylidene chloride copolymer is a copolymer of vinylidene chloride and acrylonitrile.

6. A heat-sealable wrapping material as claimed in claim 1 in which the film is regenerated cellulose film.

7. The heat-sealable wrapping material of claim 1 in which the resin is a coumarone resin.

8. The heat-sealable wrapping material of claim 1 in which the resin is a terpene-phenol resin.

9. The heat-sealable wrapping material of claim 1 in which the resin is a polymerized silicone resin.

10. A heat-sealable coating composition for use in coating a film consisting of a vinylidene chloride copolymer containing from about 85 to about 95% vinylidene chloride and at least one different resin having a melting point above 150° C. which different resin is selected from the group consisting of a derivative of colophony, a coumarone resin, a polymerized silicone resin and a terpene-phenol and which different resin is present in an amount of from about 2% to about 10% by weight and a volatile organic solvent.

11. A heat-sealable coating composition as claimed in claim 10 in which the resin is present in an amount in the range between 2 and 5% by weight on the weight of the solids.

12. A heat-sealable coating composition as claimed in claim 10 in which the resin is a pentaerythritol ester of polymerized colophony.

References Cited

UNITED STATES PATENTS

| | | | |
|---|---|---|---|
| 3,340,092 | 9/1967 | Craver et al. | 117—122 X |
| 2,147,772 | 2/1939 | Kallander | 117—68.5 |
| 2,608,542 | 8/1952 | Smith et al. | 260—27 |
| 2,684,919 | 7/1954 | Berry et al. | 117—76 |
| 2,910,385 | 10/1959 | Berry et al. | 117—138.8 |
| 3,025,167 | 3/1962 | Butler | 99—171 |
| 3,240,932 | 3/1966 | Haines | 250—49.5 |
| 3,259,061 | 7/1966 | Wiswell | 101—149.2 |
| 3,264,136 | 8/1966 | Hedge | 117—138.8 |

FOREIGN PATENTS 567,747   12/1958   Canada.

WILLIAM D. MARTIN, Primary Examiner

B. D. PIANALTO, Assistant Examiner

U.S. Cl. X.R.

117—161, 145; 260—27, 827, 884